No. 667,741. Patented Feb. 12, 1901.
W. SKAKEL.
CULTIVATOR SHOVEL CLEANER.
(Application filed June 27, 1900.)
(No Model.) 3 Sheets—Sheet 3.
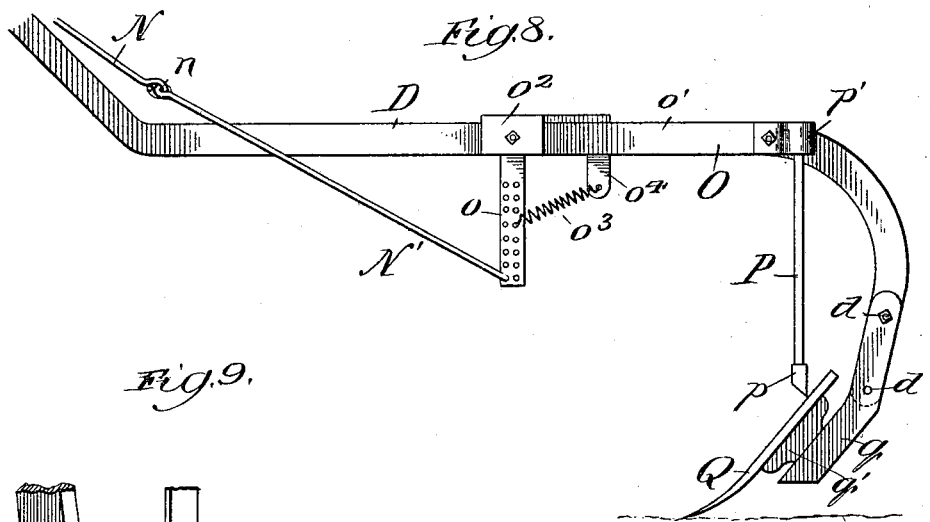
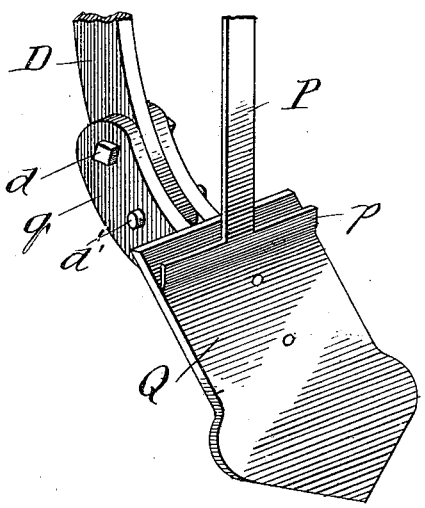
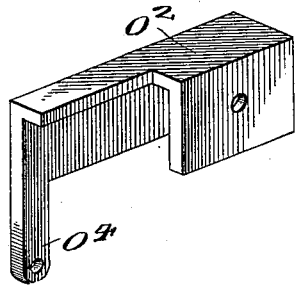
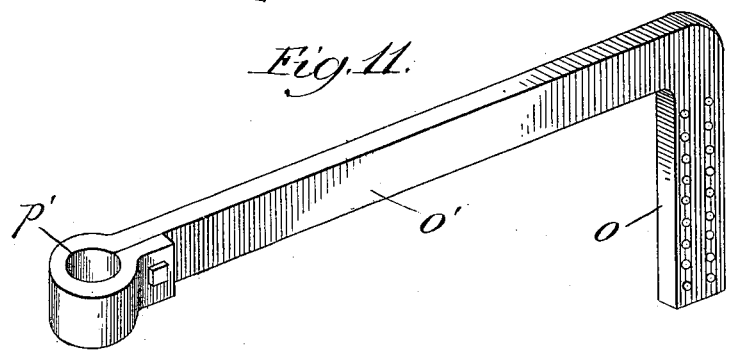
Witnesses:
John Enders Jr
Geo. C. Davison
Inventor:
William Skakel,
By Banning & Banning
Attys

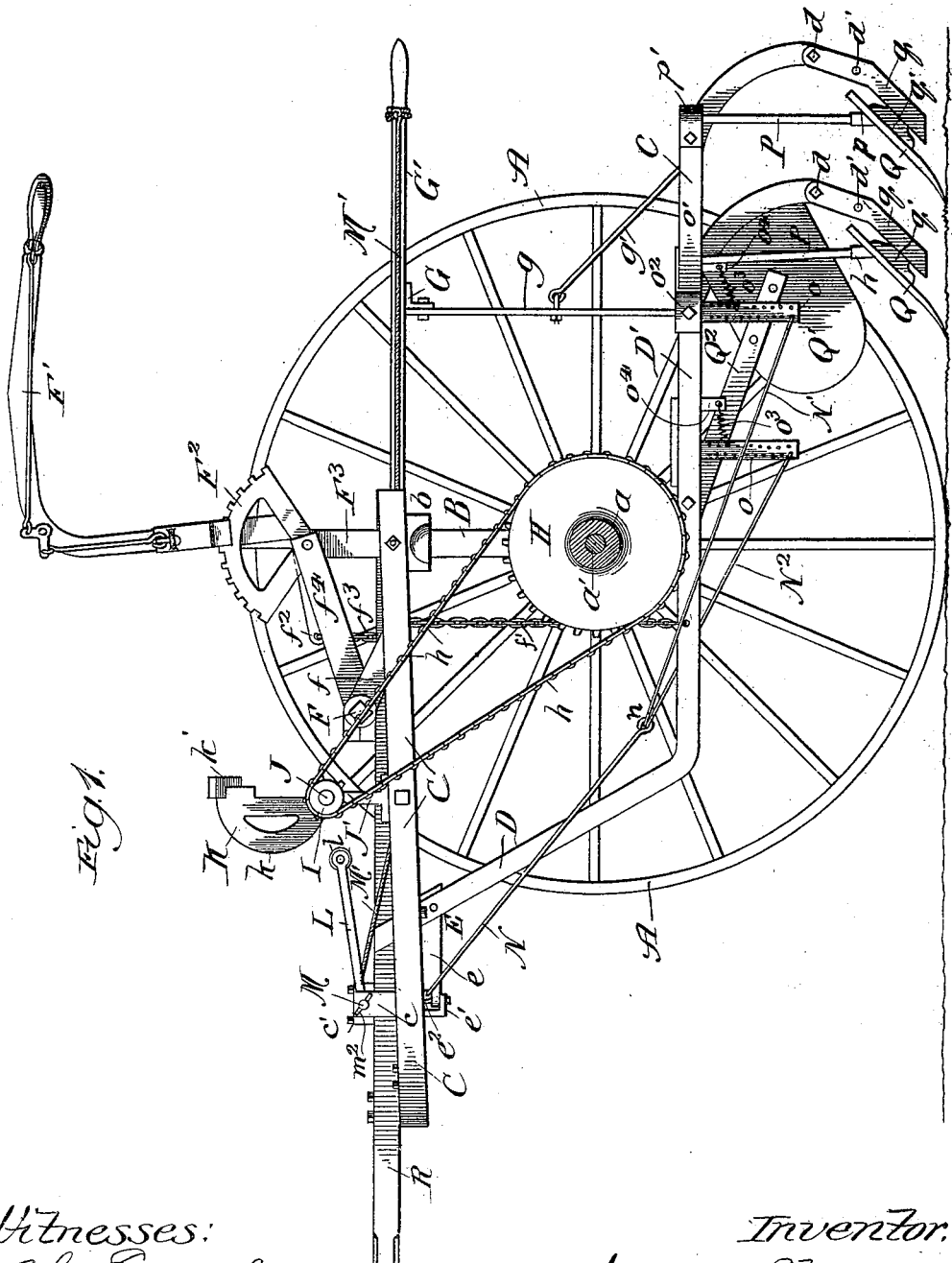

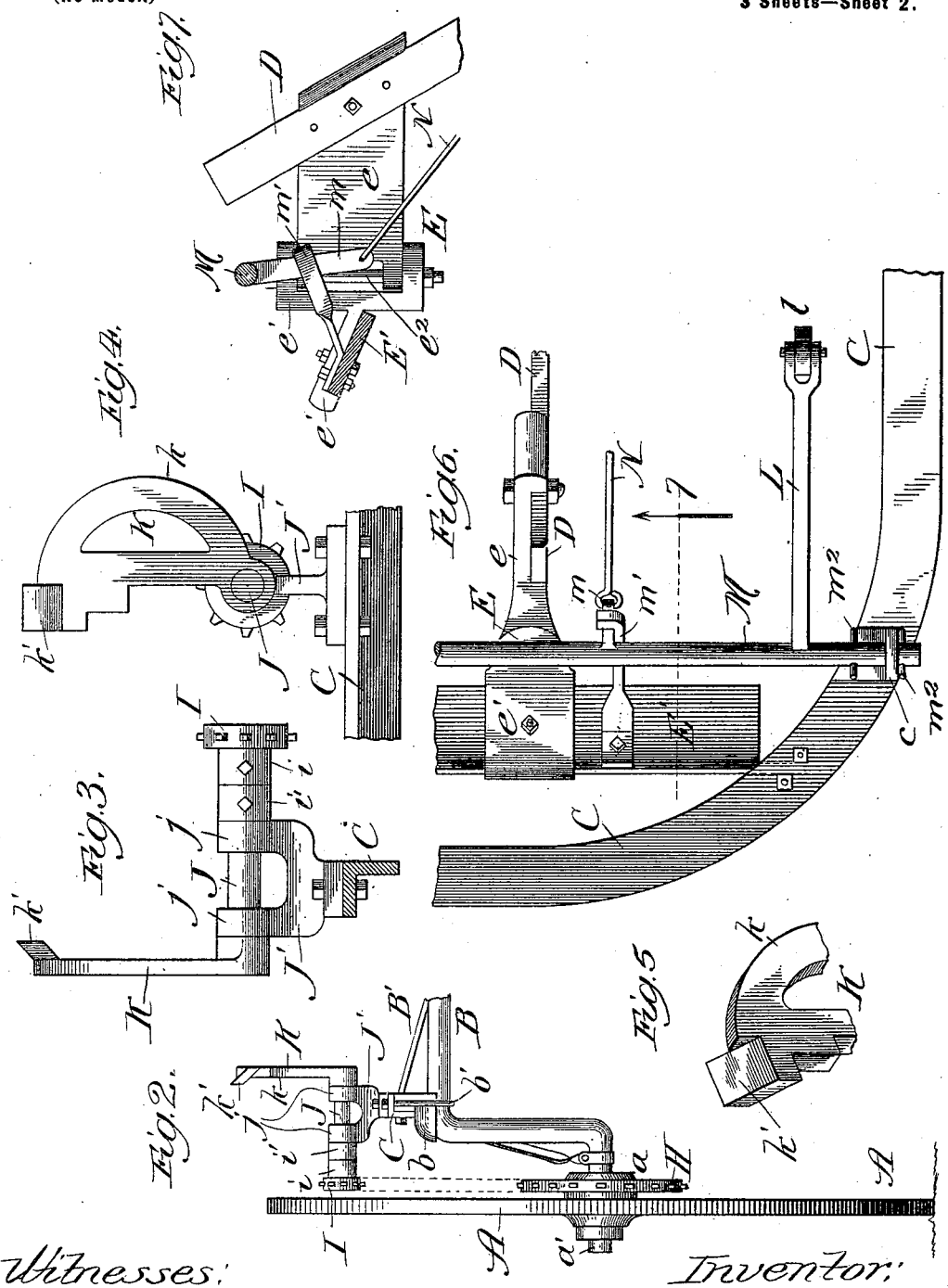

UNITED STATES PATENT OFFICE.

WILLIAM SKAKEL, OF WAGNER, SOUTH DAKOTA.

CULTIVATOR-SHOVEL CLEANER.

SPECIFICATION forming part of Letters Patent No. 667,741, dated February 12, 1901.

Original application filed March 12, 1900, Serial No. 8,308. Divided and this application filed June 27, 1900. Serial No. 21,727.

(No model.)

*To all whom it may concern:*

Be it known that I, WILLIAM SKAKEL, a citizen of the United States, residing at Wagner, in the county of Charles Mix and State of South Dakota, have invented certain new and useful Improvements in Cultivator-Shovel Cleaners, of which the following is a specification, the same being a division of my application, Serial No. 8,308, filed March 12, 1900.

It is well known that in the use of cultivators in clayey, damp, or sticky soil it is exceedingly difficult to keep the shovels scoured or cleaned, and unless the shovels are maintained in a scoured and clean condition the operation of cultivating is rendered difficult and troublesome. It is the general practice in the use of cultivators to raise the plows from the ground when the soil has become stuck thereto and clean the shovels by hand and any means obtainable.

The object of this invention is to construct and apply a shovel-cleaner attachment to a cultivator which will be automatically operated by the travel of the machine whether the shovels are in or out of the ground, the attachment also being of a nature to permit the cleaners to be operated by hand, if required; and the invention consists in the features of construction and the combination of parts hereinafter described and claimed.

In the drawings only so much of a cultivator as is necessary to show the invention is illustrated, the parts not fully illustrated being of the formation of the parts in my said application Serial No. 8,308 or of other form of construction for the parts.

In the drawings, Figure 1 is a side elevation with one of the carrying-wheels removed to show the driving-wheel and chain for operating the shovel-cleaners. Fig. 2 is a detail, being a rear elevation of the end of a cultivator having thereon the driving connection for operating the shovel-cleaners; Fig. 3, a detail in elevation of the shaft and cam for operating the shovel-cleaners; Fig. 4, a side elevation of the parts shown in Fig. 3; Fig. 5, a perspective view of one end of the cam of the shovel-cleaning device; Fig. 6, a detail in plan of one forward corner of the frame, showing the swing-board for the forward end of the plow-beams and the lever and rock-shaft for the shovel-cleaners; Fig. 7, a detail of the joint and swing-board and connection for the plow-beams and the rock-shaft and its arm for the shovel-cleaner; Fig. 8, a detail, being a side elevation of one of the plow-beams, showing the shovel-cleaner and the devices for operating the same; Fig. 9, a perspective view of a shovel and a cleaner; Fig. 10, a perspective view of the bracket or support carrying the L-lever of the shovel-cleaning device, and Fig. 11 a perspective view of the L-lever of the shovel-cleaner.

The machine is to have carrying-wheels A at each end of an arched axle B, which wheels are mounted on spindles $a'$, extending out from the arched axle and entering the hubs $a$ of the wheels. A frame C, preferably of steel or iron, of angular shape in cross-section, is attached to supports $b$ on the axle B and held in place by clips $b'$ or otherwise, and a truss-rod B' for the axle can be used, if desired.

The machine is to be provided with plow-beams, which may be of the "split-beam" variety, having a main beam D and a secondary beam D', both the main beam and the secondary beam carrying at their rear end a shovel. The beams can be arranged so as to have two beams carrying four shovels, as usual, or they can be arranged with three beams, the center one carrying three shovels, as in my application of which this is a division. The forward end of each plow-beam may be attached by a two-way coupling E, which permits of a lateral swing, and by its attachment to a carrying-board E' vertical swing is permitted. The coupling E for the lateral swing, as shown, consists of a plate or casting $e$, pivoted at its forward end between ears on a bracket or casting $e'$ by a bolt $e^2$, with the bracket or casting $e'$ attached to the swing-board E', which board extends across the front of the machine.

A rock-shaft F is mounted in suitable bearings on the tongue or frame of the machine, so as to extend laterally across the machine. This rock-shaft is provided with an arm $f$ for each plow-beam, and a chain $f'$ connects the plow-beam with the arm $f$, so as to give the necessary flexibility for the movements of the beam. A lifting and setting lever F' is pivotally mounted on a standard $F^3$, which standard at its upper end has a rack $F^2$ for coöperation with a pawl or catch on the lever F' for the lever to raise and lower the plow-beams and be locked and held in its adjusted position. The lever F', as shown, has a rearwardly-extending arm $f^2$, and a chain $f^3$ connects this arm with an arm on the rock-shaft for the downward movement of the lever to partially rotate the rock-shaft and raise the plow-beams simultaneously. A cross-bar G is shown for connecting the plow-beams together and has its movements controlled by levers G', two being provided in order to permit either hand of the operator to be used in moving the beams, one to grasp and move the levers, leaving the other hand free for driving or other purposes. The levers G' also enable the plow-beams to be raised vertically, when desired for any purpose, and, as shown, each plow-beam is connected with the cross-bar by a pendant or hanger $g$ and a brace $g'$, but can be otherwise connected, so long as the connection is one permitting the plow-beams to have a support by which they can be moved in unison by the movement of the cross-bar.

The parts so far described relate to the subject-matter of my said application Serial No. 8,308 and are fully set forth and their operation described in said application, and therefore the construction and operation of these parts in detail are not herein described and pointed out, as the parts form no part of the present invention, which relates to the shovel-cleaners, which will now be described.

One of the carrying-wheels A has secured to its hub $a$ in any suitable manner so as to revolve therewith a sprocket-wheel H, and a sprocket-chain $h$ runs over this sprocket-wheel and over a sprocket-pinion I, so that with the revolving of the carrying-wheel A the sprocket-chain will be driven to rotate the sprocket-pinion I. This pinion is on the end of a shaft J, mounted in bearings $j$ on a support J', attached to the frame-piece C, and, as shown, the pinion is attached to the end of the shaft by its hub $i$ and a suitable set-screw, and between the hub and the bearings for the shaft is a collar or thimble $i'$; but the thimble or collar could be omitted and the hub $i$ extended, if so desired, in order to properly locate the pinion in line with the sprocket-wheel on the carrying-wheel. The shaft J at its opposite end carries a cam K, which cam has an acting face $k$ and at its outer corner has an inclined face $k'$, projecting beyond the side face of the cam. The acting face $k$ when the cam is revolved engages an antifriction-roller $l$ on an arm or lever L, extended out from a rock-shaft M, such engagement occurring only when the arm or lever and its roller are in the line of the path of travel of the cam and its acting face $k$. The rock-shaft M is supported at one end in a support $c$ and extends transversely across the machine, so as to cover the space occupied by the plow-beams, and its other end may be supported on the frame or otherwise. The shaft M, at points in line with each plow-beam, has an arm $m$, and the limit of throw or rock of the shaft in a forward direction is controlled by a catch or stop $m'$, attached to the swinging board E', as shown in Figs. 6 and 7. The shaft M, in addition to its rocking movement, has an endwise movement, which movement is limited by pins $m^2$ on each side of the support $c$, as shown in Fig. 6. This endwise movement is for the purpose of enabling the shaft, with its arms, to be moved endwise a distance required to bring the arm or lever L and its roller $l$ into the path of travel of the cam K and its face $k$, so that with the downward movement of the cam through the engagement with the roller the arm or lever moves the arms $m$ forward for a purpose hereinafter explained.

The rock-shaft is returned to its normal position and out of the line of engagement of the cam with the arm or lever by the incline $k'$ on the cam, which strikes the end of the arm or lever and through its inclined face moves the rock-shaft endwise out of position, so that on the succeeding revolution of the cam no engagement will take place between the cam and the arm or lever, and no movement of the rock-shaft will occur. The rock-shaft is moved endwise, so as to bring the arm or lever L in proper position for engagement by means of a cord M' in the arrangement shown, which cord at one end can be attached to the rock-shaft and extended back and attached to one of the levers G' or otherwise, so as to be within reach of the operator for the operator by grasping and pulling on the cord to slide the rock-shaft endwise into operative position, which movement should be made when the shovels need cleaning.

A rod N is attached to each arm $m$ and extends rearwardly and at its rear end has jointed thereto at $n$ two rods N' and N², and a rod N and its companion rods N' and N² are to be provided for each pair of shovels. Each rod N' and N² is attached to an L-lever O, the attachment being to the arm $o$ of such lever, which arm, as shown, is provided with a series of holes for the attachment of the rod on one side and the proper attachment of a return-spring $o^3$ on the other side. Each lever O has an arm $o$ and an arm $o'$ and is pivotally mounted on each beam by means of a support or bracket $o^2$, the same bolt which attaches the support or bracket also furnishing the pivot for the lever. The plate or bracket has a depending ear $o^4$, between which and the arm $o$ of the lever is the coil-spring $o^3$, having the requisite tension to return the lever after each operation from the rock-shaft, such return of the lever O also, through the connecting-rods, returning the rock-shaft. A lever O is provided for each shovel, and each lever, at the outer end of its arm $o'$, has depending therefrom a spring or flexing support P, which support at its upper end is pivotally mounted in an eye or socket $p'$ on the rear end of the lever-arm $o'$ and at its lower end carries a scraper $p$ to engage the acting face of the shovel Q. Each shovel Q is carried by a shovel-block $q'$, attached to a support q, which in turn is connected with the end of the shovel-beam by a bolt d and a break-pin d' in the usual manner. The downward rock of the shaft M, through the forward movement of the arm m, moves each rod N forward, carrying with it the connecting-rods N' and N², and each of these rods operates its own lever O, producing a downward throw of the outer end of the arm o', which forces down the spring or flexing support P and moves the cleaner p downward over the face of the shovel.

The movement of the cleaners, as before stated, is controlled by the operator through the cord M', and when it is desired to clean the shovels the operator by pulling on the cord moves the rock-shaft M endwise into position for the engagement of the arm or lever L with the cam K, which engagement, as already described, carries down the scraper or cleaner for each shovel, so that all the shovels will be cleaned or operated upon at one and the same time, and when the cleaner or scraper has traveled the full length of its shovel the cam, through its incline k', moves the rock-shaft endwise and out of line of engagement of the lever L, permitting the springs o³ to operate and return the L-levers O and the scrapers or cleaners of the shovels and the other parts to normal position. The cleaning operation can be performed with the shovels in the ground or it can be performed with the shovels out of the ground, as may be desired, and such cleaning operation is had through the travel of the machine by the rotation of the carrying-wheels, which rotates the sprocket-wheel, by which arrangement the cleaning operation is automatically performed by the travel of the cultivator, except as to the requirement of moving the rock-shaft endwise in the arrangement which, as shown, is performed by hand. It is evident that by disconnecting the draw-rods for operating the levers O the lever would be free to permit the scraper to be passed over the face of the shovel by hand, if so desired.

As shown, each shovel Q is provided with an ordinary shield Q', carried by a bar Q² from the plow-beam, as usual, and a tongue R, suitable for the attachment of horses and fastened to the frame of the machine, is to be provided, which tongue being of the usual construction and attached in the usual way is not therefore specifically shown nor described in this application.

I claim—

1. In a cultivator, the combination of a carrying-wheel, a driving-wheel on the carrying-wheel, a shaft driven from the driving-wheel, a cam on the shaft, a rock-shaft actuated from the cam and means operated from the rock-shaft, for moving a scraper or cleaner over the face of the shovel, substantially as described.

2. In a cultivator, the combination of a revolving cam, an arm or lever engaged by the cam, a rock-shaft moved by the arm or lever, an arm on the rock-shaft, a lever pivotally mounted on the plow-beam, a connection between the rock-shaft arm and the plow-beam lever, and a scraper or cleaner carried by the plow-beam lever and moved across the face of the shovel by the throw of the plow-beam lever, substantially as described.

3. In a cultivator, the combination of a rock-shaft, means for moving the shaft from the carrying-wheel, an arm on the rock-shaft, a lever pivotally mounted on the plow-beam, a connection between the lever and the arm of the rock-shaft, and a scraper or cleaner carried by the lever on the plow-beam, for operating the scraper or cleaner with the travel of the cultivator, substantially as described.

4. In a cultivator, the combination of a revolving cam, means for operating the cam from a carrying-wheel of the cultivator, an acting face on the cam, an incline at one end of the cam, a rock-shaft, an arm or lever on the rock-shaft engaged by the acting face of the cam, and means for moving the rock-shaft endwise into engagement and have the shaft automatically moved endwise out of engagement by the incline on the cam, substantially as described.

5. In a cultivator, the combination of plow-beams, each plow-beam carrying shovels, an endwise-moving rock-shaft, a cam for rocking the shaft, a series of arms on the rock-shaft one for each plow-beam, a lever pivotally mounted on each plow-beam, connections between the levers and the rock-shaft arms, and a scraper or cleaner for each lever movable across the face of each shovel for scraping and cleaning the shovel, substantially as described.

6. In a cultivator, the combination of a plow-beam, a shovel on the beam, and a scraper or cleaner carried by the plow-beam and actuated across the full face of the shovel independent of the movement of and irrespective of the position of the beam, substantially as described.

7. In a cultivator, the combination of a plow-beam, a shovel on the plow-beam, a lever pivotally mounted on the plow-beam and a scraper carried by the lever for the movement of the lever to carry the scraper or cleaner across the full face of the shovel independent of the movement of and irrespective of the position of the beam, substantially as described.

8. In a cultivator, the combination of a plow-beam, a shovel on the plow-beam, a lever pivotally mounted on the plow-beam, a scraper carried by the lever and a rock-shaft for moving the lever to carry the scraper or cleaner across the full face of the shovel independent of the movement of and irrespective of the position of the beam, substantially as described.

WILLIAM SKAKEL.

Witnesses:
THOMAS A. BANNING,
THOMAS B. McGREGOR.